United States Patent [19]
Rauhala

[11] Patent Number: 6,151,314
[45] Date of Patent: Nov. 21, 2000

[54] USE OF HEADER FIELDS OF AN ATM CELL IN RADIO CONNECTED ATM DATA TRANSFER

[75] Inventor: Kristian Rauhala, Espoo, Finland

[73] Assignees: Nokia Mobile Phones Ltd., Salo; Nokia Telecommunications Oy, Espoo, both of Finland

[21] Appl. No.: 08/734,882

[22] Filed: Oct. 22, 1996

[30] Foreign Application Priority Data

Dec. 1, 1995 [FI] Finland ..................................... 955813

[51] Int. Cl.⁷ ........................................................ H04J 3/06
[52] U.S. Cl. ......................... 370/350; 370/392; 370/394; 370/397
[58] Field of Search ..................................... 370/360, 371, 370/379, 381, 386, 392, 394, 395, 397, 399, 404, 905, 328, 329, 331, 465, 477, 503, 509, 522, 338; 455/436–438, 440, 442, 443, 67.1

[56] References Cited

U.S. PATENT DOCUMENTS

| | | |
|---|---|---|
| 5,136,584 | 8/1992 | Hedlund . |
| 5,240,009 | 8/1993 | Williams ................................. 128/702 |
| 5,257,257 | 10/1993 | Chen et al. .............................. 370/441 |
| 5,345,448 | 9/1994 | Keskitalo ................................ 370/331 |
| 5,345,558 | 9/1994 | Opher et al. ............................ 709/236 |
| 5,410,733 | 4/1995 | Niva et al. ............................... 455/437 |
| 5,434,853 | 7/1995 | Hemmady et al. . |
| 5,438,565 | 8/1995 | Hemmady et al. . |
| 5,440,547 | 8/1995 | Easki et al. . |
| 5,483,668 | 1/1996 | Malkamaki et al. .................... 455/442 |
| 5,524,009 | 6/1996 | Tuutijarvi et al. ...................... 370/332 |
| 5,570,368 | 10/1996 | Murakami et al. ..................... 370/395 |
| 5,638,371 | 6/1997 | Raychaudhuri et al. ............... 370/347 |
| 5,703,873 | 12/1997 | Ojanpera et al. ....................... 370/332 |
| 5,710,974 | 1/1998 | Granlund et al. ........................ 455/62 |
| 5,774,809 | 6/1998 | Tuutijarvi et al. ...................... 455/437 |
| 5,809,399 | 9/1998 | Tuutijarvi et al. ........................ 455/63 |
| 5,815,801 | 9/1998 | Hamalainen et al. .................... 455/63 |
| 5,819,174 | 10/1998 | Kyllonen ................................. 455/414 |
| 5,845,192 | 12/1998 | Saunders ................................. 455/11.1 |
| 5,854,977 | 12/1998 | Oksanen et al. ........................ 455/417 |
| 5,864,759 | 1/1999 | Tat ........................................... 455/437 |
| 5,870,675 | 2/1999 | Tuutijarvi et al. ...................... 455/436 |
| 5,918,170 | 6/1999 | Oksanen et al. ........................ 455/343 |
| 5,924,030 | 7/1999 | Rautiola et al. ........................ 455/426 |
| 5,940,371 | 8/1999 | Mitts et al. .............................. 370/236 |
| 5,956,331 | 9/1999 | Rautiola et al. ........................ 370/338 |
| 6,002,686 | 12/1999 | Mitts et al. .............................. 370/394 |
| 6,014,550 | 1/2000 | Rikkinen .................................. 455/63 |

FOREIGN PATENT DOCUMENTS

| | | |
|---|---|---|
| 0366342 A2 | 5/1990 | European Pat. Off. . |
| 0577959 A1 | 1/1994 | European Pat. Off. . |
| 0616480 A2 | 9/1994 | European Pat. Off. . |
| 0679042 A2 | 10/1995 | European Pat. Off. . |
| WO 93/19559 | 9/1993 | WIPO . |

OTHER PUBLICATIONS

08/369,074, Terho et al., filed Jan. 5, 1995.

*Primary Examiner*—Seema S. Rao
*Attorney, Agent, or Firm*—Perman & Green, LLP

[57] ABSTRACT

In a telecommunication system, where data is transported as cells (C1 through C10) and that comprises a wired connection network system and an at least partly wireless connected wireless access system, short addressing is used within the wireless access system, so that there will be space left free in the header fields of the cells for transferring data applying to cell for the internal control within the wireless access system. E.g. in case of the macro-diversity, an identifier of the terminal device (MT1, MT2), a sequence number of the cell and an indicator expressing the quality of the incoming cell are added by the base stations (BTS1, BTS2, BTS3) to the ATM cells formed by them. The base station controller (BSC) operating as a switch combines the cells routed over different paths by storing them to a memory (MEM, MEM1, MEM2), where the cells corresponding each sequence number are arranged in sequence indicated by their quality indicator. Per each sequence number, only one cell representing the best quality is read and a cell stream formed by the cells being read will be forwarded to the network system.

15 Claims, 3 Drawing Sheets

USE OF HEADER FIELDS OF AN ATM CELL IN RADIO CONNECTED ATM DATA TRANSFER

BACKGROUND OF THE INVENTION

The present invention is generally related to a wireless access network utilizing ATM in fixed network infrastructure, and more particularly to using the header fields of an ATM cell in an efficient way from the point of view of the data transfer, associated with the said wireless connection segment.

The ATM (Asynchronous Transfer Mode) is strongly offered as a candidate for the fast data transfer system of the future e.g. in the B-ISDN networks (Broadband Integrated Services Digital Network) and in the mutual communication of information transfer devices in general. The network consists of nodes and terminal devices and the connections between them. In the ATM network, information is transported in digital form as cells each of which comprises a so called payload of 48 bytes and a header part of 5 bytes. In order to keep the amount of the header information as small as possible, no complete information on routing between the transmitting and receiving device is included in the headers, but only information on the virtual path and channel where the data in question is transported. The nodes of the network include the required routing information, according to which the corresponding identifiers of the virtual path and channel are interpreted as addresses to the next node, respectively.

Use of the cell header is strictly specified in the specifications of the ATM concept. The header includes a Virtual Path Identifier (VPI) of 8 through 12 bits, a Virtual Channel Identifier (VCI) of 16 bits, a Generic Flow Control (GFC) of 0 through 4 bits, 3 bits to express the type of the payload and one bit to express the priority class of the cell and 8 bits including an error correction code calculated according to the rest of the cell header.

Traditionally, ATM connections have been considered as fixed wired or optical fiber connections. It can be seen, however, that in the data transfer solutions of the future, the terminal devices must be provided with the same mobility and independency from the fixed connections that the mobile phones of cellular networks already have. Because of its functionality and flexible variability, the wireless access network of cellular type is an obvious architecture also in the future. A typical cellular network comprises several Base Transceiver Stations (BTS) that are usually connected over the Base Station Controller (BSC) to the Mobile Switching Center (MSC). A wide cellular network has numerous Mobile Switching Centers and their subordinated Base Transceiver Stations and Base Station Controllers. The coverage area of each base station, in other words, the geographical area, where the terminal devices can have a radio connection with the said base station, is called a cell. In order to avoid confusions, however, the word cell refers in this patent application only to the unit of the data to be transported in accordance with the specifications of the ATM system, the length thereof being 53 bytes.

The part of the data transfer network where wireless connection is essential for the data transport is called a Wireless Access System (WAS), or Radio Access System when radio communications are used. When connecting a cellular radio network with the wired connection ATM network, the radio access system, generally specified, comprises the data transfer segments from the terminal device to the point, from where the transport is forwarded without any changes to the general ATM specifications. The Wireless Access System generally comprises e.g. terminal devices, base stations and a base station controller, the last mentioned having a wired connection with the general ATM network. Because of the mobility of the terminal devices and the character of the data to be transferred, it is necessary to transfer within the radio access system additional information that is not separately specified in the cell specifications of the ATM system. The additional information is e.g. associated with the macro-diversity, in other words, routing the connection simultaneously along several parallel paths, with the handover function for changing the base station and in case of a telephone connection with packing of speech data. The problem is, how this data will be transported within the radio access system in the most efficient way without unnecessary delays and waste of resources. In addition, the macro-diversity and handover functions require some kind of synchronizing between the cells transferred over different base stations, because the ATM system as such does not include any mechanisms for correcting errors arising from cell losses or from changes in their mutual sequence. Errors on the cell level have the influence that the data structure determined on some higher layer and comprising several cells (PDU, Protocol Data Unit) is noticed to be incorrect and will be rejected, whereupon maybe lots of correct cells must be retransmitted.

Known from the patent publication EP 366 342 (AT&T) there is a procedure, according to which the data is transported in a radio connected cellular network as cells, and in the header part of each cell there is an unchanging part that remains unchanged independently from the changes in the routing, and a changing part, the contents of which will be changed in connection with the base station handover or some other change of the routing. It is stated in the publication that the arrangement can make the base station handover easier, but the relief is aimed only at the routing definition. A same kind of procedure is presented in the patent application EP 577 959 (Roke Manor Research Ltd.), where it is especially aimed at the ATM network. There the unchanging part of the cell header is the so called VCI field (Virtual Channel Identifier) and the changing part is the so called VPI field (Virtual Path Identifier).

Known from the article "LAN Emulation on an ATM Network" of Hong Linh Truong, IEEE Communications Magazine, May 1995, there is a short addressing method, according to which an address space of only 12 bits can be used in the local area network emulation. It is proposed in the publication that the number of 4096 potential addresses of 12 bits is sufficient for the needs of a small local network, so that the VPI field of the ATM cell in its long form can be used as an address. The short addressing data alone is, however, insufficient for transporting the above mentioned additional data. It has been proposed that for transporting the additional data, the payload part of the ATM cells would be used, but as thereby the share of the actual data to be transferred is decreased, the efficiency of the method suffers. It has also been proposed that in the radio connection two different channels would be used for transporting the additional data and the actual data to be transferred, respectively. This spends the resources of the system, too, and in addition, it is not possible to transfer accurately the data addressed specifically to a certain ATM cell.

Known from the article "BAHAMA: A Broadband Ad-Hoc Wireless ATM Local-Area Network" of K.Y.Eng et al, Proc.ICC'95, Jun., 18–22, 1995, Seattle, there is a procedure, where the GFC field included in the header part of the ATM cells is used for implementing the sequence numbering applying to cell. It is the intention to help synchronizing and combining of the cell streams coming along two parallel channels to a certain combining point. The numbering of the cells is especially aimed at an unequivocal identification of the cells, so that the cells by the combining of cell streams won't be doubled or lost and their sequence will remain unchanged. The numbering alone is, however, insufficient for transporting all the necessary additional data and through the four bits of the GFC field, only a very limited amount of information can be transported, anyway. It is one object of the present invention to provide a method where the data transfer within the radio access system in connection with the ATM network is efficiently executed. It is another object of the present invention to provide a method for improving the use of the base station handover and macro-diversity operations in this kind of a radio access system. It is a further object of the invention to provide an equipment for implementing this kind of a method.

SUMMARY OF THE INVENTION

The objects of the present invention are attained by using short addressing within the radio access system and by locating the additional information relating to the connection and cell into the VCI field of the ATM cells.

The method in accordance with the present invention for implementing information transfer within the radio access system in a telecommunication system including for one thing a radio access system based on radio communication and comprising a terminal device, at least one base station and a switch, and for another thing a network system based on wired communication and comprising nodes, said switch being at the same time one node of said network system, said method having the data transported as cells comprising a header part with header fields included therein, is characterized in that within said radio access system, a short addressing scheme concerning said cells is used so that the address data of the cells is transported in a certain part of said header field and other data applying to cell concerning data transfer internal to said radio access system is transported in the remaining parts of said header field.

The invention also concerns switch means for transferring data in a cell form between a wired connection network system and an at least partly radio connected radio access system in a telecommunication system, where said radio access system comprises a terminal device, at least one base station and a switch and said network system comprises nodes, whereby said switch is at the same time one node of said network system, said switch means being characterized in that it comprises memory means and means for interpreting a header part of the cells transferred in said radio access system and for storing the cells into said memory means based on the data applying to cell included in the header part of the cells.

The present invention is based on the idea that a short addressing scheme can be used within the radio access system and additional information relative to the connection and/or cell being necessary for controlling the operations characteristic of the radio access segment can be added to the space of 16 bits that is thus left free in the header of each cell. When the cells are forwarded from the radio access system to the actual ATM network, their headers are changed according to the usual ATM addressing. At the same time, the data applying to cell is used for synchronizing the cell streams received along different routes and for securing the best possible connection quality.

The VCI field is used according to the present invention at least in information transfer between the base stations and the base station controller being parts of the radio access system. Over the radio interface between the base station and the terminal device, the additional data is transported either in the same way in the VCI field of the ATM cells or in a certain way characteristic of the radio interface in question. E.g. in a radio access system using a Time Division Multiple Access (TDMA) the additional data can be specific to timeslot, whereby its position is determined by the protocol of the radio access system in question.

By help of the present invention, the advantage is gained that the whole payload part of the ATM cells can be reserved for the actual data to be transferred. Moreover, as the additional data is located in the header part of the cells, for which an error correction code will be calculated according to the ATM specifications, the transfer of the additional data is more secure than in case it is transported in the payload part of the cells. Further, because the additional data can be determined per cell, it can be used for identifying the cells, which in general is not possible in the ATM system except for the AAL 1-lever numbering from 0 to 5. In that case the base station controller or some other switch means, the task of which is to combine the cell streams routed because of the macro-diversity along two different ways, will be able to synchronize the cells so that no cells are lost or doubled and that the mutual sequence of the cells is not changed.

BRIEF DESCRIPTION OF THE DRAWING

The present invention will be described in more detail in the following with reference to the exemplified preferred embodiments and accompanying drawings, wherein.

In the figures, the corresponding elements are identified by the same reference numbers and symbols.

DETAILED DESCRIPTION OF THE INVENTION

Figure 1:
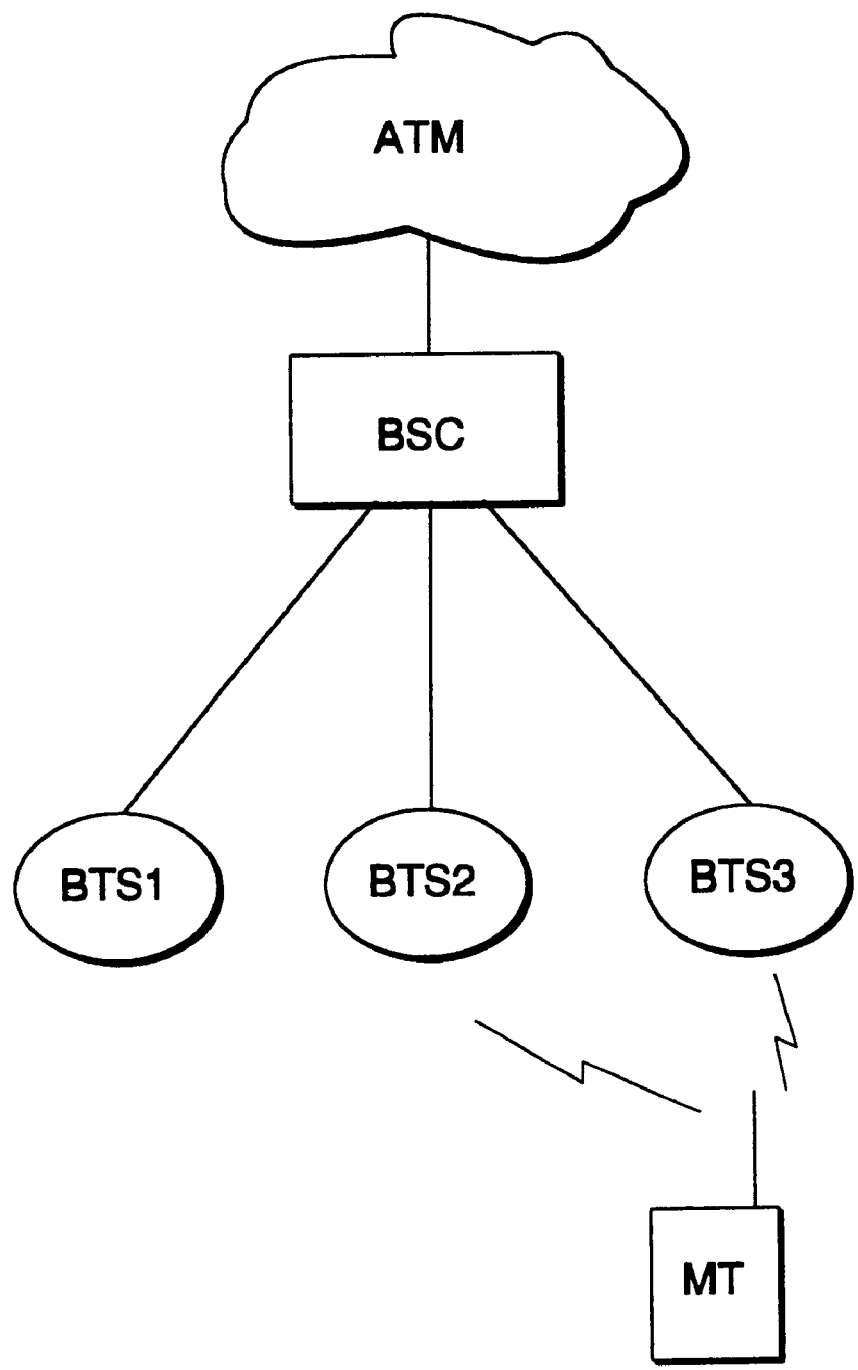
FIG. 1 illustrates a telecommunications system, where the method in accordance with the present invention can be used.

In FIG. 1, a telecommunications system is illustrated comprising a base station controller BSC, three base stations BTS1, BTS2 and BTS3 and a terminal device MT. The base stations have a wired connection with the base station controller having for its part a wired connection with the general ATM network. The terminal device has a radio connection at least with one base station. In case of FIG. 1, macro-diversity is applied, so that the terminal device MT has a connection with two base stations BTS2 and BTS3 that transmit the data further to the base station controller BSC acting as a combining point. Thus, it is profitable to number the ATM cells to be transported along different paths so that it can be judged in the combining point, which cells correspond to each other. According to the preferred embodiment of the invention, the terminal device places some identifier, being for instance a cyclically repeated sequence number applying to cell and its own MTI (Mobile Terminal Identifier), into the data to be transferred over the radio interface. The data to be transferred over the radio interface can be already in the form of ATM cells or it may correspond to some of the radio transfer protocols known in the art. In the latter case the ATM cells won't be formed until in the base stations BTS2 and BTS3, whereby the short addressing scheme is applied and the sequence number applying to cell and the Mobile Terminal Identifier MTI received over the radio interface are located by the base stations into the available VCI field of the cells.

Additionally, the base stations measure the quality of the incoming cells, which means here especially the correctness of the data. Due to the different transmission circumstances the data received by different base stations includes a different amount of errors. The base stations BTS2 and BTS3 locate preferably a quality factor indicating the quality of the incoming data to the VCI field of those cells that are forwarded to the base station controller BSC that can compare the quality indicator in the cells received over different routes and choose the best one of the cells.

Figure 2A:
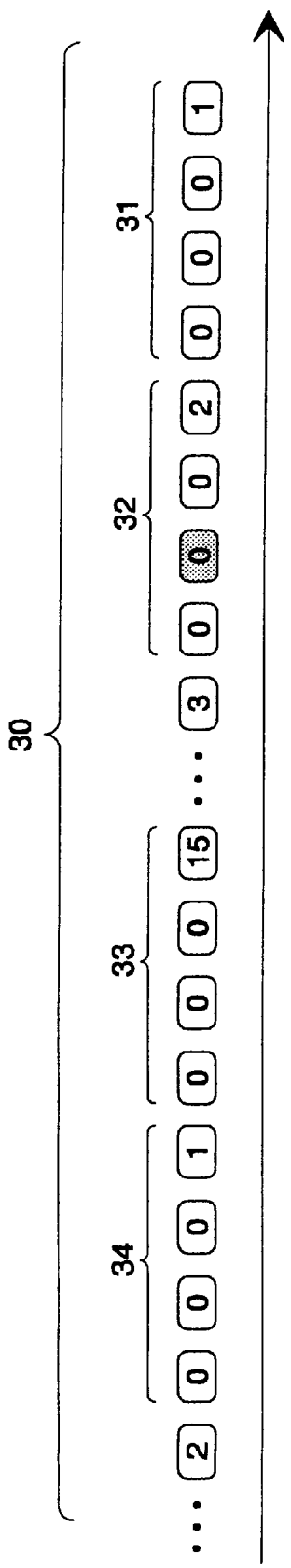
FIG. 2a illustrates a cell reference procedure in accordance with one preferred embodiment of the present invention.
Figure 2B:
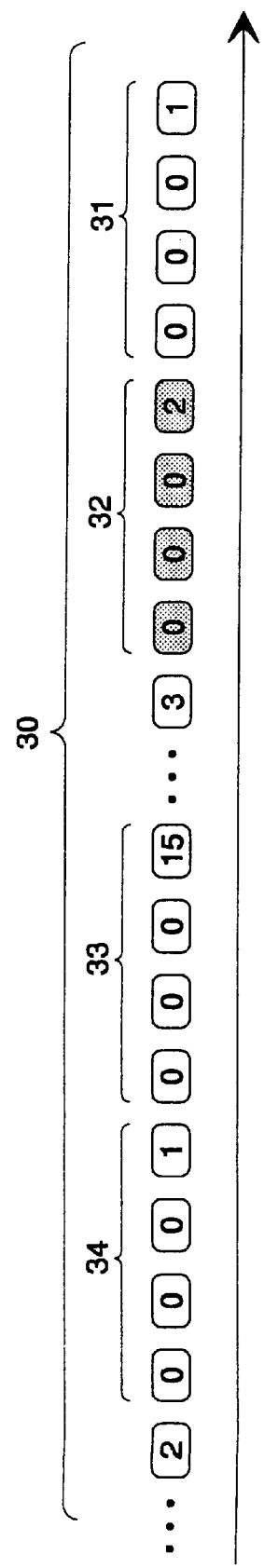
FIG. 2b illustrates one different reference procedure in the embodiment of FIG. 2a, and FIG. 3 illustrates in more details the telecommunications system in accordance with FIG. 1.

When numbering the cells, however, it is often not practical to number each cell separately. In that case a method described in FIGS. 2a and 2b can be used. The cell stream 30 is divided into groups, of which the groups 31, 32, 33 and 34 are shown in FIGS. 2a and 2b, each group comprising four cells. The invention does not substantially require that the groups should have an equal number of cells or that the groups should be in sequence, on the contrary, the size of the groups can vary and they can be interlaced in the cell stream in different ways. The invention is, however, most easily understood in the form illustrated in the FIGS. 2a and 2b.

The first cell of the groups 31 through 34 (in figures the cell to the right) is the so called counter cell, its VCI field (not separately shown in the figures) including a consecutive sequence number. The cycle of the counter, that is the value after which the sequence number returns to the beginning, depends on the number of bits used for this purpose. In the embodiment according to the figures, four bits are used for expressing the sequence number, the counter values varying from 1 to 15, the limit values included. In the other cells of the groups the counter bits are zeros or they can be the same as those in the first cell of the group. In the figures the number in each cell indicates the value of the counter bits of the cell in question. By setting these to zeros in others than the first cell of the group, the first cell of the group can be more easily recognized. A certain value of the counter bits is understood so that it refers to the whole cell group. Inside the group it is still possible to refer separately to a certain cell by indicating which cell from the beginning of the group is concerned. The cells themselves include no information on their respective sequence numbers, so that a reference to the cell number n of the group can be made only if no cell of the first n-1cells has been lost and if the position of the cell referred to has not changed in the group. These both requirements are characteristics required in the ATM system too, so that they do not set unreasonable additional demands on the reliability of the system.

In FIG. 2a, the shaded cell is identified by qualifier "counter=2, third cell". In FIG. 2b, reference is made to the whole cell group by qualifier "counter=2". As the group has several cells, the return of the counter back to the beginning (compare group 31 and 34) takes much longer than if each cell were numbered separately with a sequence number from 0 to 15. By the numbering per group the risk of confusing will be reduced, resulted otherwise from the fact that the cycle of the counter is rather short and there can be several hundreds of cells simultaneously e.g. in a certain buffer.

In addition or instead of the regular sequence numbering, also other identification procedures are applicable. One possibility is to generate and agree in advance among all devices of the data transfer on some non-recurring number sequence, e.g. the decimals of pi. The sending device gives in order numbers of the said non-recurring number sequence as identifiers of certain cells of the cell stream. Then the receiving device knows that if for instance a certain point of the number sequence includes the numbers "-3-8-2", the incoming cells 3 and 8 must in sequence be followed by the cell 2. As the statistic probability of two certain numbers occurring one after another in a non-recurring number sequence is about 1/100, an effective counter cycle of hundred cells is attained with an identifier of one figure.

In the following, application of the invention to a data communications system will be explained with reference to the particularized illustration of FIG. 3. The description will be especially focused on the operation of the base station driver BSC operating as a combining point.

Figure 3:
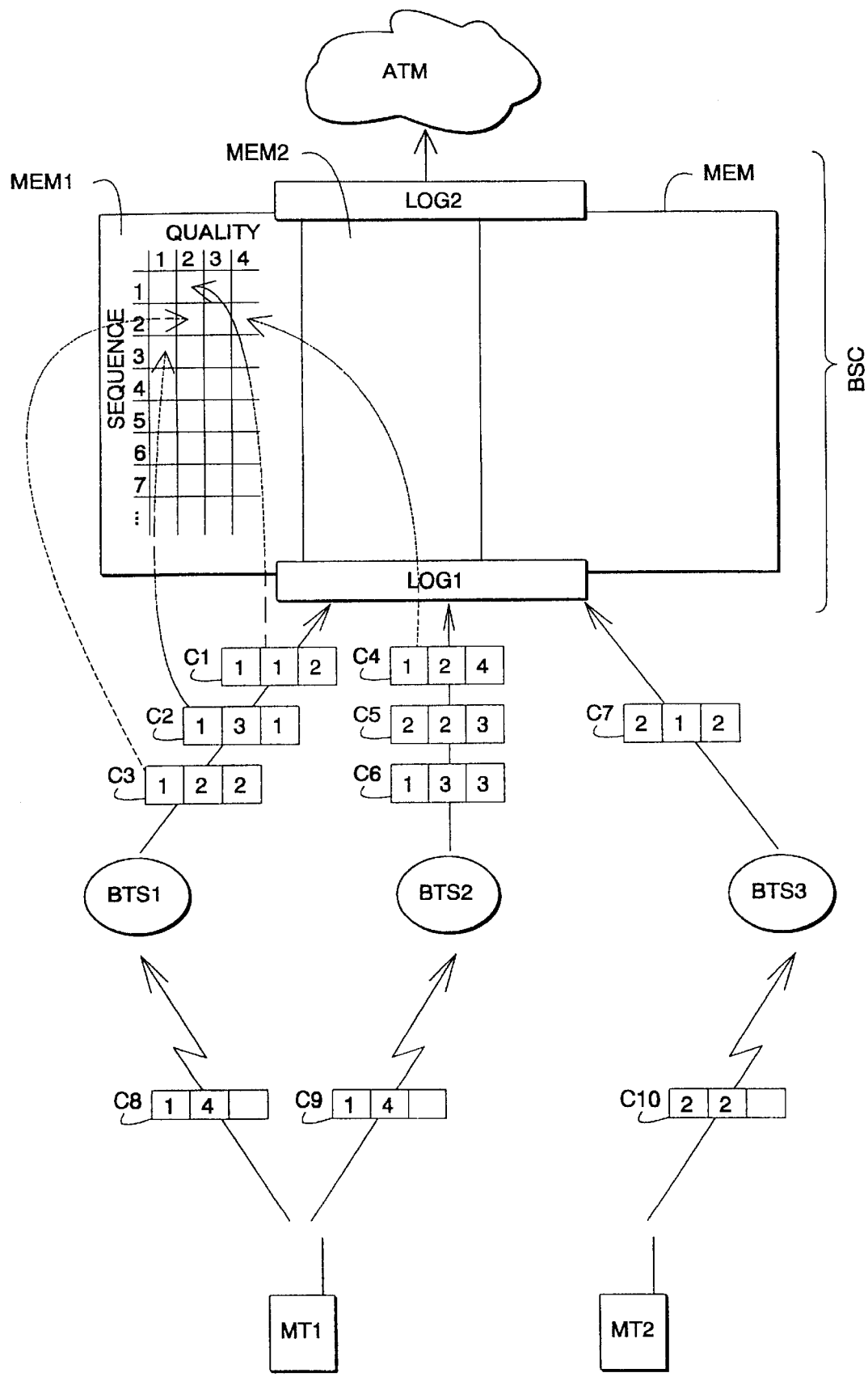

FIG. 3 illustrates a part of the memory area MEM of the base station driver BSC, being used for combining and synchronizing the cell streams coming from the terminal devices MT1 and MT2 over different base stations BTS1, BTS2 and BTS3, and the logic LOG1 for controlling the cell writing and the logic LOG2 for controlling the reading thereof. The figure also illustrates schematically several cells C1 through C10 to be transferred, only those fields thereof being shown for clarity that are significant for the invention. The fields of each cell C1 through C10 are from left to right respectively the mobile terminal identifier, the cell identifier and a value indicating the quality of the incoming cell, the last mentioned being added to the cell not until in the base station BTS that measures the correctness of the incoming cell. As stated above, the cells are not necessarily transferred between the terminal devices MT1 and MT2 and the base stations BTS1 through BTS3 as such in accordance with the specifications of the ATM system, but they can e.g. be divided, combined and/or interlaced according to the transfer protocol applicable in the radio interface.

In FIG. 3, the base station BTS1 has received the cells C1, C2 and C3 from the terminal device MT1 illustrated by number 1 in the mobile terminal identifier field. The cells are the first, the second and the third cell of the present counter sequence, but due to an error occurred by transferring of the second cell and due to the retransmission, the second cell C3 and the third cell C2 have changed places in the cell stream. The quality class of the first cell C11 and the second cell C3 is 2 and the quality class of the third cell C2 is 1. It is assumed here that the cell quality, in other words its correctness, is the better, the bigger the value indicating its quality class is. Cells C4 and C6 sent by the first terminal device MT1 and the cell C5 sent by the second terminal device MT2 have been received over the second base station BTS2. Cell C7 sent by the second terminal device MT2 has been received over the third base station BTS3.

In the base station controller BSC, the logic LOG forwards said cells to the memory areas MEM1 and MEM2 that are dynamically reserved for the use of the terminal devices MT1 and MT2. In the embodiment of FIG. 3, the memory areas have further been divided into rows and columns, so that each row corresponds to a certain sequence number and each column corresponds to a certain quality class. Thus, the cell C1 is forwarded to the second column of the first row on the memory area MEM1 reserved for use of the terminal device MT1, cell C2 to the first column of the third row on the same area and cell C3 to the second column of the second row. Correspondingly, cell C4 is forwarded to the fourth column of the second row and cell C6 is forwarded to the third column of the third row. Cells C5 and C7 are forwarded to the places indicated by their sequence and quality numbers respectively, on the memory area MEM2 reserved for use of the terminal device MT2. Forwarding of cells C8 through C10 will be determined according to their quality class to be defined by the reception.

The base station controller BSC combines the cell streams to be sent forward so that the logic LOG2 reads in sequence on the row corresponding each sequence number the value corresponding the best quality class. E.g. in the case of FIG. 3, the cells C1, C4 and C6 are read from the memory MEM to the cell stream in order to transmit forward the data sent by the terminal device MT1. In another possible embodiment that doesn't require an as big storage capacity to be reserved for each terminal device, there is only one column per terminal device in the memory of the base station controller, on the certain row of which the incoming cell corresponding the sequence number of the row will be stored only in case the row in question is still empty or the quality class of the new cell is better than that of the cell already stored on the row. So in the latter case, the cell with a better quality is preferably stored over the previous cell, whereby the previous cell will be deleted. The four step quality classification illustrated in FIG. 3 is only meant as an example and it is clear for a man skilled in the art that also other quality classifications known in the art can be used. Correspondingly, instead of the sequence numbering of the embodiment in FIG. 3 also other sequence numbering systems can be applied to. For the base station handover, no special measures are required, as the different base stations can any time transmit data even one cell at a time to be combined with the data transmitted by other base stations.

Implementation of the operation according to FIG. 3 doesn't require significant changes to the ATM switches known in the art operating in connection with the base station controllers. Implementation of the logic itself for the cell routing management either as a hardware or software implementation is known by a man skilled in the art. By the above described arrangement in accordance with the present invention, wherein the combining and synchronizing of cell streams is controlled based on the data per cell located into the header field of the ATM cells, a good reliability and macro-diversity functions are attained. The payload part of the cells can be used for transporting the actual data to be transferred, whereby the system works efficiently and makes good use of the available resources. Although reference is made above to the implementation of the present invention in the ATM systems only, it is also applicable to other network systems wherein the data transfer applying to cell or frame is necessary within a limited sector in particular for the internal data transfer of the said sector, said data to be located into the part of the cell or frame header field or fields that will be left free due to the short addressing scheme applied within said sector.

What is claimed is:

1. A method for implementing information transfer within a wireless access system in a communication system including a wireless access system based on wireless communication and comprising plural terminal devices (MT1, MT2), plural base stations (BTS1, BTS2, BTS3) communicating with the terminal devices, a switch (BSC) operative to communicate with said base stations, and a network system (ATM) communicating via the switch with said plural base stations, the network system being based on wired communication and comprising nodes, said switch (BSC) being one node of said nodes of said network system, said method comprising steps of communicating information as cells (C1–C10) having a header part with header fields included therein, employing throughout said wireless access system a short addressing scheme concerning said cells, transporting address data of the cells in a certain part of said header fields, and transporting other data applying to a cell and concerning data transfer internal to said wireless access system in another part of said header fields; and including identifications of individual ones of said terminal devices in respective ones of said header fields to enable synchronization of cell streams received concurrently at said switch via a plurality of said base stations from said terminal devices.

2. A method in accordance with claim 1, wherein said other data applying to cell comprises an identifier of the terminal device (MT1, MT2) that is the source of the data to be transported.

3. A method in accordance with claim 1 wherein said other data applying to cell comprises an identifier indicating the position of said cell compared with other cells in the cell stream formed by successive cells.

4. A method in accordance with claim 1 wherein said other data applying to cell comprises a quality in indicator indicating the correctness of the data included in said cell.

5. A method in accordance with claim 1 wherein said cells (C1 through C10) are routed in wireless radio access system from said terminal device (MT1, MT2) over at least two of said base stations (BTS1, BTS2, BTS3) to said switch (BSC).

6. A method in accordance with claim 5, wherein said switch (BSC) combines the cells (C1 through C10) routed from a certain terminal device over different ones of said base stations into one cell stream to be forwarded to said network system (ATM).

7. A method in accordance with claims 6 wherein the cells (C1, C2, C3, C4, C6) routed from a certain terminal device (MT1) over different ones of said base stations to be combined into said one cell stream are stored into memory means (MEM, MEM1, MEM2) of the switch in sequence given by identifiers indicating the mutual positions of the cells.

8. A method in accordance with claim 7, wherein the cells (C1, C2, C3, C4, C6) routed from a certain terminal device (MT1) over different base stations to be combined into said one cell stream are stored into memory means (MEM, MEM1, MEM2) of the switch also in an order given by the quality indicators indicating the correctness of the cells.

9. Switch means (BSC) for transferring information in a cell between a wired connection network system and at least a partly wireless connected wireless access system in a telecommunication system, wherein said wireless access system comprises plural terminal devices (MT1, MT2), plural base stations (BTS1, BTS2, BTS3) in communication with said terminal devices and a switch (BSC) operative to communicate with said base stations, said network system communicating with said plural base stations via said switch, said network system comprising nodes, said switch (BSC) being one of said nodes, wherein said switch means comprises memory means and means (LOG1) for interpreting a header part of the cells, in each of respective ones of communications from said terminal devices, transferred in said wireless access system and for storing the cells in said memory means based on cell data included in the header part of the cells, said cell data being communicated in said header part via said switch means throughout said wireless access system, said header part including a short address scheme, and wherein there is included identifications of individual ones of said terminal devices in said respective header parts to enable synchronization of cell streams received concurrently at said switch via a plurality of said base stations from an individual one of said terminal devices.

10. Switch means in accordance with claim 9, wherein said means (LOG1) is for storing the cells into said memory means (MEM, MEM1, MEM2) based on the identifier included in the header part of the cells indicating the position of each cell in the cell stream.

11. Switch means in accordance with claim 9, wherein said means (LOG1) is for storing the cells into said memory means (MEM, MEM1, MEM2) based on the quality indicator included in the header part of the cells indicating the correctness of each cell.

12. Switch means in accordance with claim 9, further comprising means (LOG2) for combining the cells stored into said memory means into a cell stream to be forwarded to said network system (ATM).

13. Switch means in accordance with claim 12, wherein said means for combining the cell stream comprises means for reading the cells selectively from the memory means (MEM, MEM1, MEM2) by choosing only one cell based on each identifier indicating a position of a cell.

14. A method for implementing information transfer within a wireless access system in a communication system including a wireless access system based on wireless communication and comprising plural terminal devices (MT1, MT2), plural base stations (BTS1, BTS2, BTS3) communicating with the terminal devices, a switch (BSC), and a network system (ATM) communicating via the switch with said base stations, the network system being based on wired communication and comprising nodes, said switch (BSC) being one node of said nodes of said network system, said method comprising steps of communicating information as cells (C1–C10) each having a header part with header fields included therein, employing throughout said wireless access system a short addressing scheme concerning said cells, transporting address data of the cells in a certain part of said header fields, transporting other data applying to a cell and concerning data transfer internal to said wireless access system in another part of said header fields; and including identifications of individual ones of said terminal devices in respective ones of said header fields to enable synchronization of cell streams received concurrently at said switch via a plurality of said base stations from said terminal devices.

15. Switch means (BSC) for transferring information in a cell between a wired connection network system and at least a partly wireless connected wireless access system in a telecommunication system, wherein said wireless access system comprises plural terminal devices (MT1, MT2), plural base stations (BTS1, BTS2, BTS3) in communication with said terminal devices, and a switch (BSC), said network system communicating with at least one of said base stations via said switch, said network system comprising nodes, said switch (BSC) being one of said nodes, wherein said switch means comprises memory means and means (LOG1) for interpreting a header part of respective ones of the cells transferred in said wireless access system and for storing the cells in said memory means based on cell data included in the header part of the cells, said cell data being communicated in said header part via said switch means throughout said wireless access system, said header part including a short address scheme, and wherein there is included identifications of individual ones of said terminal devices of said header part to enable synchronization of cell streams received concurrently at said switch via a plurality of said base stations from said terminal devices.

* * * * *